US012317366B2

(12) United States Patent
Chen et al.

(10) Patent No.: US 12,317,366 B2
(45) Date of Patent: May 27, 2025

(54) GRACEFUL LEAVING PROCEDURE FOR MULTIPLE USIM UE

(71) Applicant: Telefonaktiebolaget LM Ericsson (publ), Stockholm (SE)

(72) Inventors: Qian Chen, Mölndal (SE); Christofer Lindheimer, Vadstena (SE); Stefan Rommer, Västra Frölunda (SE); Paul Schliwa-Bertling, Ljungsbro (SE); Magnus Stattin, Upplands Väsby (SE); Alessio Terzani, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 539 days.

(21) Appl. No.: 17/763,064

(22) PCT Filed: Sep. 7, 2020

(86) PCT No.: PCT/EP2020/074982
§ 371 (c)(1),
(2) Date: Mar. 23, 2022

(87) PCT Pub. No.: WO2021/069163
PCT Pub. Date: Apr. 15, 2021

(65) Prior Publication Data
US 2022/0408519 A1 Dec. 22, 2022

Related U.S. Application Data

(60) Provisional application No. 62/913,936, filed on Oct. 11, 2019.

(51) Int. Cl.
*H04W 88/06* (2009.01)
*H04W 76/27* (2018.01)
(Continued)

(52) U.S. Cl.
CPC .......... *H04W 76/34* (2018.02); *H04W 76/27* (2018.02); *H04W 84/042* (2013.01); *H04W 88/06* (2013.01)

(58) Field of Classification Search
None
See application file for complete search history.

(56) References Cited

U.S. PATENT DOCUMENTS

| 2019/0021128 | A1  | 1/2019 | Sivavakeesar |            |
|--------------|-----|--------|--------------|------------|
| 2022/0232364 | A1* | 7/2022 | Tsuda        | H04W 8/183 |
| 2023/0189208 | A1* | 6/2023 | Kim          | H04W 60/00 |
|              |     |        |              | 370/329    |

OTHER PUBLICATIONS

International Search Report and Written Opinion of the International Searching Authority, PCT/EP2020/074982, mailed Mar. 2, 2021, 12 pages.

(Continued)

*Primary Examiner* — Minh Trang T Nguyen
(74) *Attorney, Agent, or Firm* — Sage Patent Group

(57) ABSTRACT

A method, UE, and computer programs are provided where the UE has multiple universal subscriber identity modules. Information is received from a first PLMN indicating there is one of mobile terminating (MT) signaling or data in the first PLMN while the UE is in a second PLMN. Responsive to receiving the information, a service request is sent to an AMF node of the second PLMN. A radio resource control (RRC) connection release is received from a RAN node in response to sending the service request. Responsive to receiving the RRC connection release, the second PLMN is left to be in the first PLMN.

20 Claims, 8 Drawing Sheets

(51) Int. Cl.
*H04W 76/34* (2018.01)
*H04W 84/04* (2009.01)

(56) References Cited

OTHER PUBLICATIONS

Qualcomm Incorporated: "Solution for Suspend and Resume procedure," 3GPP Draft; SA WG2 Meeting #135, S2-1909746, Oct. 14-18, 2019, Split, Croatia, 5 pages.
Sony: "Solution: Busy Indication as a paging response," 3GPP Draft; SA WG2 Meeting #135, S2-1909466, Oct. 14-18, 2019, Split, Croatia, 5 pages.
Intel, et al., "Key issue on mechanism for suspension/resumption," 3GPP Draft: SA WG2 Meeting #S2-135, S2-1909940, Oct. 14-18, 2019, Split, Croatia, 2 pages.
Apple: "Solution for communication suspension and resumption," 3GPP Draft: SA WG2 Meeting #S2-135, S2-1909672, Oct. 14-18, 2019, Split, Croatia, 3 pages.
Intel, et al., "Key issue on mechanisms for suspension/resumption," 3GPP Draft: SA WG2 Meeting #S2-135, S2-1909854, Oct. 14-18, 2019, Split, Croatia, 2 pages.
3rd Generation Partnership Project; "Technical Specification Group Services and System Aspects," Procedures for the 5G System (5GS); Stage 2 (Release 16); 3GPP TS 23.502, V16.2.0, Sep. 2019, Valbonne, France, 525 pages.
3rd Generation Partnership Project; Technical Specification Group Services and System Aspects, System Architecture for the 5G System; Stage 2 (Release 15); 3GPP TS 23.501, V15.6.0, Jun. 2019, Valbonne, France, 243 pages.
Examination Report for Indian Patent Application No. 202247026356, mailed Sep. 14, 2022, 6 pages.

\* cited by examiner

GRACEFUL LEAVING PROCEDURE FOR MULTIPLE USIM UE

CROSS REFERENCE TO RELATED APPLICATIONS

This application is a 35 U.S.C. § 371 national stage application of PCT International Application No. PCT/EP2020/074982 filed on Sep. 7, 2020, which in turn claims domestic priority to U.S. Provisional Patent Application No. 62/913,936, filed on Oct. 11, 2019, the disclosures and content of which are incorporated by reference herein in their entireties.

TECHNICAL FIELD

The present disclosure relates generally to communications, and more particularly to communication methods and related devices and nodes supporting multiple universal subscriber identity module devices.

BACKGROUND

There is a trend to support user equipments (UEs) with multiple universal subscriber identity modules (USIMs) (typically two). For example, there are there are many commercially deployed devices that support more than one USIM (typically two) in which the USIMs may be from the same or from different network operators. For example, there are passive UEs where the UE contains two SIMs, but only one SIM can be selected for use at any given time, dual SIM dual standby UEs where both SIMs can be used for idle-mode network connection, but when a radio connection is active the second connection is disabled, and dual SIM dual active UEs where both SIMs can be used in both idle and connected modes.

The SIMs in a dual SIM dual standby UE may share a single transceiver. Through time multiplexing, two radio connections are maintained in idle mode. When in-call on network for one SIM, it is no longer possible to maintain radio connection to the network of the second SIM, hence that connection is unavailable for the duration of the call. Registration to the second network is maintained.

In a dual SIM dual active UE, each SIM has a dedicated transceiver, meaning that there are no interdependencies on idle or connected mode operation.

For cost efficiency reasons, a multi USIM UE implementation typically uses common radio and baseband components that are shared among the multiple USIMs. For example, while actively communicating with a first system associated with a first USIM, the UE needs to occasionally check the other system associated with a second USIM, e.g. to monitor the paging channel, perform signal measurements, or read the system information, determine if it needs to respond to a paging request from the other system, etc.

SUMMARY

According to some embodiments of inventive concepts, a method is performed by a processor in a user equipment, UE, having multiple universal subscriber identity modules (USIMs). The method includes receiving information from a first public land mobile network (PLMN) indicating there is one of mobile terminating (MT) signaling or data in the first PLMN while the UE is in a second PLMN. The method further includes responsive to receiving the information, sending a service request to an access and mobility management function (AMF) node of the second PLMN. The method further includes receiving a radio resource control (RRC) connection release from a radio access network (RAN) node in response to sending the service request. The method further includes responsive to receiving the RRC connection release, leaving the second PLMN to be in the first PLMN.

One potential advantage is that a way is provided for the UE to gracefully leave the network at the non-access stratum (NAS) level where the UE can enter in CM-IDLE mode in the network or at the radio resource control (RRC) level where the UE can enter in CM-IDLE (with or without suspend) or the RRC inactive state. This enables the network to realize the reason the UE is leaving the network and improve the key performance index (KPI). The network may also be provided information for the network to handle further mobile terminating signaling and data According to other embodiments of inventive concepts, a method performed by a processor in a user equipment, UE, having multiple universal subscriber identity modules (USIMs) is provided. The method includes receiving information from a first PLMN indicating there is one of mobile terminating (MT) signaling or data in the first PLMN while the UE is in a second PLMN. The method further includes responsive to receiving the information, sending one or more radio resource control (RRC) messages to a radio access network (RAN) node of the second PLMN with at least one of the one or more RRC messages having information on handling MT signaling/data in the second PLMN when the UE is in the first PLMN. The method further includes receiving a RRC connection release in response to sending the one or more RRC message, the RRC connection release comprising one of a command to move to idle mode, a command to move to idle mode with suspend or a command to enter RRC inactive mode. The method further includes responsive to receiving the RRC connection release, leaving the second PLMN to be in the first PLMN.

According to further embodiments of inventive concepts, a method performed by a processor in an access and mobility management function, AMF, node of a public land mobile network, PLMN, is provided. The method includes receiving a request from a user equipment, UE, having multiple universal subscriber identity modules, USIMs, to leave the PLMN for a first PLMN, the request comprising information indicating at least one service class the UE wants to continue to receive mobile terminating, MT, signaling or data received in the PLMN when the UE is in the first PLMN. The method includes responsive to receiving the request, determining whether to move the UE to connection management, CM,-idle mode, move the UE to CM-idle mode with suspend, or release UE context to a radio access network, RAN, node to determine whether to move the UE to radio resource control, RRC, inactive mode based on the request. The method further includes responsive to determining to move the UE to CM-idle mode or CM-idle mode with suspend: instructing the UE to move to CM-idle mode or CM-idle mode with suspend and adjusting idle periodic mobility handling based on the information in the request.

According to further embodiments of inventive concepts, a method of operating a radio access network, RAN, node in a first public land mobile network, PLMN, is provided. The method includes receiving an indication that a user equipment, UE, is leaving the first PLMN for a second PLMN. The method further includes receiving one or more radio resource control, RRC, messages from a user equipment, UE, with at least one of the RRC messages having information on handling MT signaling/data in the first PLMN when the UE is in the second PLMN. The method further includes determining whether the UE should enter RRC inactive state without informing an access and mobility management function, AMF, node, whether to release a UE context towards the AMF with the information, or whether to send a UE context suspend request towards the AMF node. The method further includes responsive to determining the UE should enter RRC inactive state, instructing the UE to enter RRC inactive state. The method further includes responsive to determining to release the UE context towards the AMF, sending the UE context towards the AMF node. The method further includes responsive to determining to send the UE context suspend request towards the AMF node, sending the UE context suspend request towards the AMF node.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 3:
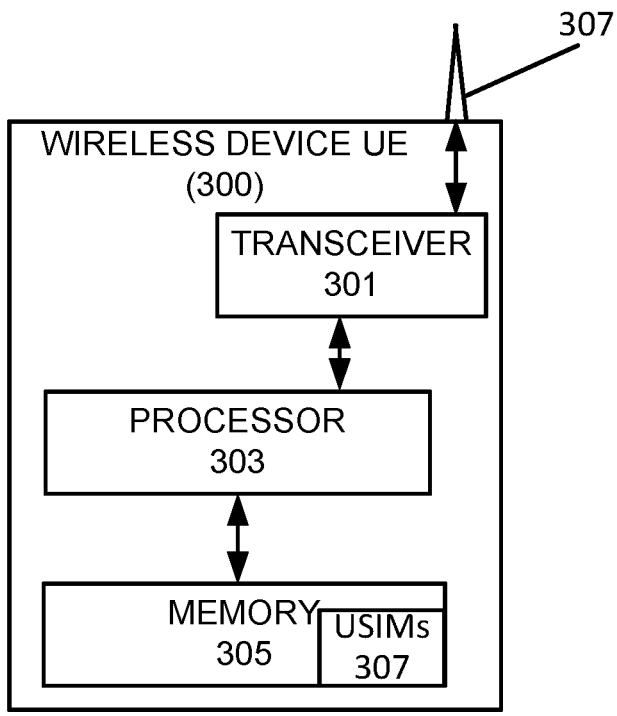
FIG. 3 is a block diagram illustrating a mobile UE having multiple USIMs according to some embodiments of inventive concepts.

FIG. 3 is a block diagram illustrating elements of a wireless device UE 300 (also referred to as a mobile terminal, a mobile communication terminal, a wireless communication device, a wireless terminal, a wireless communication terminal, user equipment, UE, a user equipment node/terminal/device, etc.) configured to provide wireless communication according to embodiments of inventive concepts. As shown, wireless device UE may include an antenna 307 and transceiver circuitry 301 (also referred to as a transceiver) including a transmitter and a receiver configured to provide uplink and downlink radio communications with a base station(s) of a radio access network. Wireless device UE may also include processing circuitry 303 (also referred to as a processor) coupled to the transceiver circuitry, and memory circuitry 305 (also referred to as memory) coupled to the processing circuitry. The memory circuitry 305 may include computer readable program code that when executed by the processing circuitry 303 causes the processing circuitry to perform operations according to embodiments disclosed herein. According to other embodiments, processing circuitry 303 may be defined to include memory so that separate memory circuitry is not required. Wireless device UE may also include an interface (such as a user interface) coupled with processing circuitry 303, and/or wireless device UE may be incorporated in a vehicle. The wireless device UE may also include multiple USIMs 307.

As discussed herein, operations of wireless device UE may be performed by processing circuitry 303 and/or transceiver circuitry 301. For example, processing circuitry 303 may control transceiver circuitry 301 to transmit communications through transceiver circuitry 301 over a radio interface to a radio access network node (also referred to as a base station) and/or to receive communications through transceiver circuitry 301 from a RAN node over a radio interface. Moreover, modules may be stored in memory circuitry 305, and these modules may provide instructions so that when instructions of a module are executed by processing circuitry 303, processing circuitry 303 performs respective operations (e.g., operations discussed below with respect to Example Embodiments relating to wireless devices).

Figure 4:
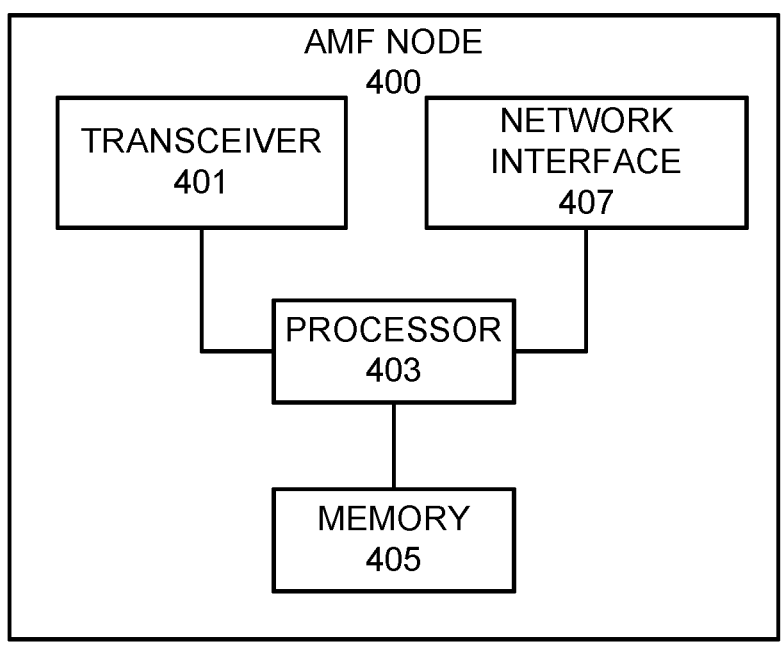
FIG. 4 is a block diagram illustrating a network node (e.g., an AMF node, an SMF node etc.) according to some embodiments of inventive concepts.

FIG. 4 is a block diagram illustrating elements of an access and mobility management, AMF node 400 (also referred to as a network node, etc.) configured to provide cellular communication according to embodiments of inventive concepts. As shown, the AMF node may include transceiver circuitry 401 (also referred to as a transceiver) including a transmitter and a receiver configured to provide uplink and downlink radio communications with mobile terminals. The AMF node may include network interface circuitry 407 (also referred to as a network interface) configured to provide communications with other nodes (e.g., with base stations) of the network and/or core network CN. The AMF node may also include a processing circuitry 403 (also referred to as a processor) coupled to the transceiver circuitry, and a memory circuitry 405 (also referred to as memory, e.g., corresponding to a device readable medium) coupled to the processing circuitry. The memory circuitry 405 may include computer readable program code that when executed by the processing circuitry 403 causes the processing circuitry to perform operations according to embodiments disclosed herein. According to other embodiments, processing circuitry 403 may be defined to include memory so that a separate memory circuitry is not required.

As discussed herein, operations of the AMF node may be performed by processing circuitry 403, network interface 407, and/or transceiver 401. For example, processing circuitry 403 may control transceiver 401 to transmit downlink communications through transceiver 401 over a radio interface to one or more mobile terminals UEs and/or to receive uplink communications through transceiver 401 from one or more mobile terminals UEs over a radio interface. Similarly, processing circuitry 403 may control network interface 407 to transmit communications through network interface 407 to one or more other network nodes and/or to receive communications through network interface from one or more other network nodes. Moreover, modules may be stored in memory 405, and these modules may provide instructions so that when instructions of a module are executed by processing circuitry 403, processing circuitry 403 performs respective operations (e.g., operations discussed below with respect to Example Embodiments relating to AMF nodes).

According to some other embodiments, an AMF node may be implemented as a core network CN node without a transceiver. In such embodiments, transmission to a wireless device UE may be initiated by the AMF node so that transmission to the wireless device is provided through a network node including a transceiver (e.g., through a base station or network node). According to embodiments where the AMF node is an AMF node including a transceiver, initiating transmission may include transmitting through the transceiver.

Figure 5:
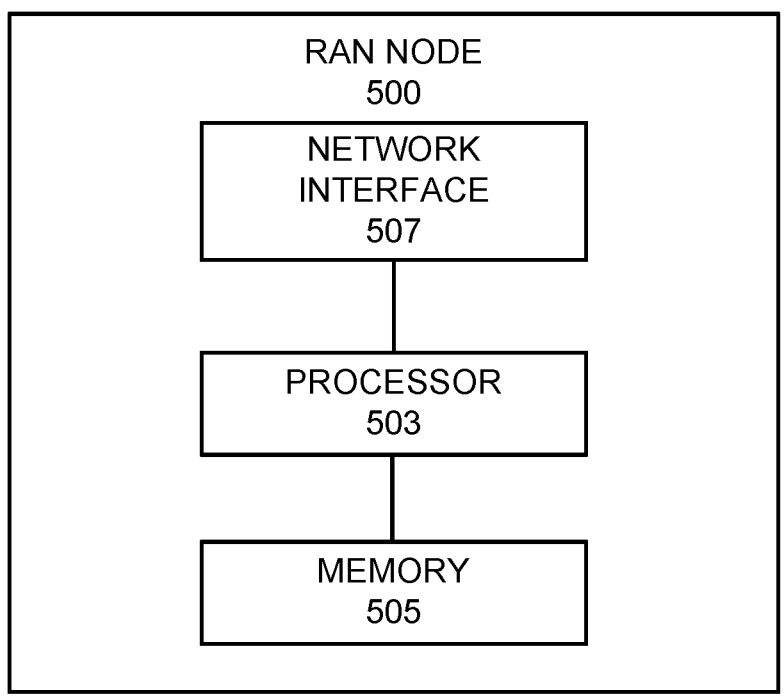
FIG. 5 is a block diagram illustrating a RAN node according to some embodiments of inventive concepts.

FIG. 5 is a block diagram illustrating elements of a radio access network, (RAN) node 500 (also referred to as a network node, etc.) configured to provide cellular communication according to embodiments of inventive concepts. As shown, the RAN node may include transceiver circuitry 501 (also referred to as a transceiver) including a transmitter and a receiver configured to provide uplink and downlink radio communications with mobile terminals. The RAN node may include network interface circuitry 507 (also referred to as a network interface) configured to provide communications with other nodes (e.g., with base stations) of the network and/or core network CN. The RAN node may also include a processing circuitry 503 (also referred to as a processor) coupled to the transceiver circuitry, and a memory circuitry 505 (also referred to as memory, e.g., corresponding to a device readable medium) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that a separate memory circuitry is not required.

As discussed herein, operations of the RAN node may be performed by processing circuitry 503, network interface 507, and/or transceiver 501. For example, processing circuitry 503 may control transceiver 501 to transmit downlink communications through transceiver 501 over a radio interface to one or more mobile terminals UEs and/or to receive uplink communications through transceiver 501 from one or more mobile terminals UEs over a radio interface. Similarly, processing circuitry 503 may control network interface 507 to transmit communications through network interface 507 to one or more other network nodes and/or to receive communications through network interface from one or more other network nodes. Moreover, modules may be stored in memory 505, and these modules may provide instructions so that when instructions of a module are executed by processing circuitry 503, processing circuitry 503 performs respective operations (e.g., operations discussed below with respect to Example Embodiments relating to RAN nodes).

According to some other embodiments, an RAN node may be implemented as a core network CN node without a transceiver. In such embodiments, transmission to a wireless device UE may be initiated by the RAN node so that transmission to the wireless device is provided through a network node including a transceiver (e.g., through a base station or network node). According to embodiments where the RAN node is a network node including a transceiver, initiating transmission may include transmitting through the transceiver.

Currently, multiple USIMs support is generally purely a UE implementation issue. Thus, a UE may abruptly release the connection of one USIM before the UE uses the other USIM. This means that the network of the released USIM will consider the release to be some sort of error scenario and the key performance index (KPI) may be significantly impacted. Additionally, when mobile terminating date or signaling is received, the network will normally trigger paging, which may result in unnecessary waste of paging resources.

The inventive concepts provide a way for the UE to gracefully leave the network at the non-access stratum (NAS) level where the UE can enter in CM-IDLE mode in the network or at the RRC level where the UE can enter in CM-IDLE (with or without suspend) or the RRC inactive state.

The advantages include enabling the network to realize the reason the UE is leaving the network and improve the key performance index (KPI). The network may also be provided information for the network to handle further mobile terminating signaling and data.

NAS Level Graceful Leaving

Figure 1:
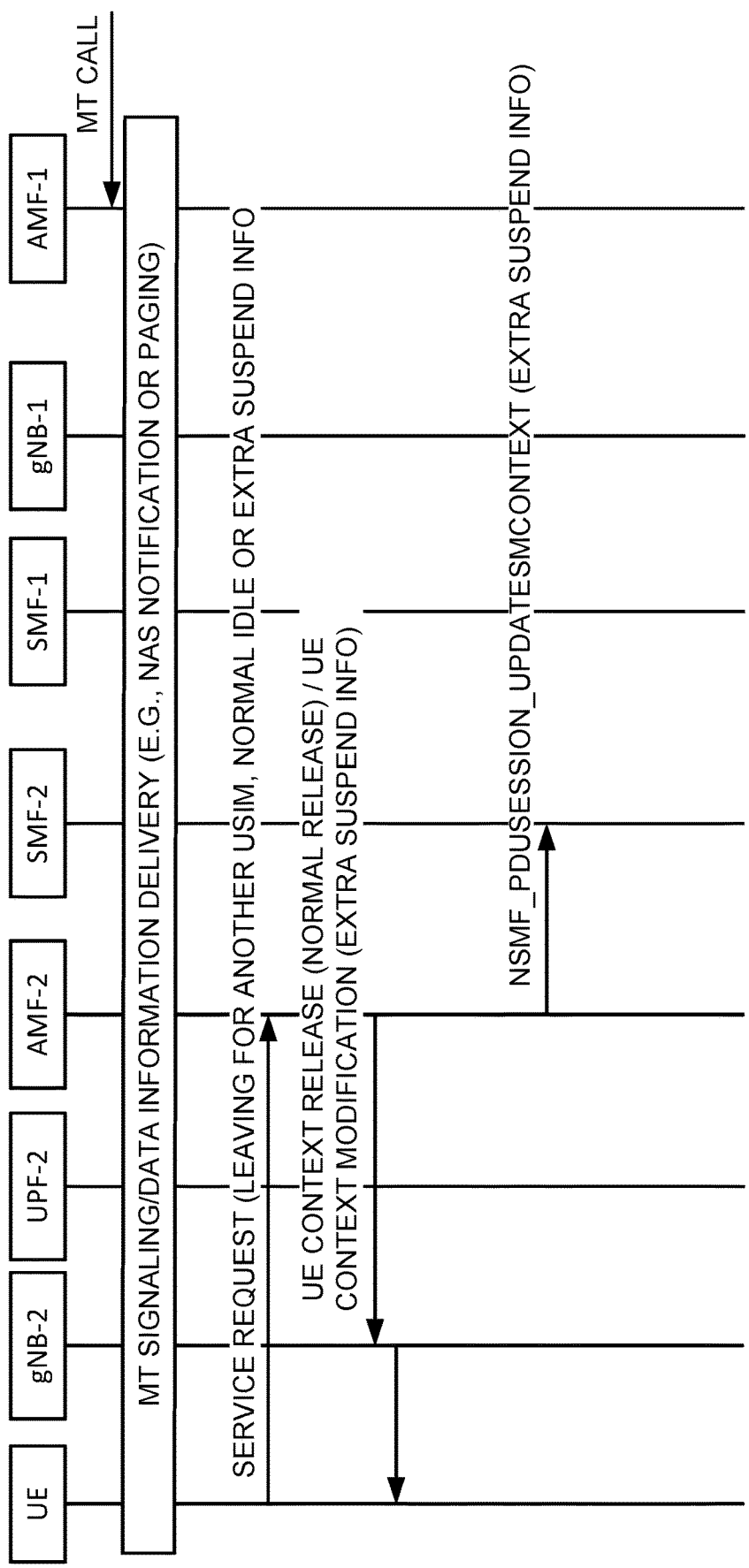
FIG. 1 is a signaling diagram of a UE leaving a network and staying in the network in CM-IDLE or CM CONNECTED with RRC Inactive in the network according to some embodiments of inventive concepts.
Figure 2:
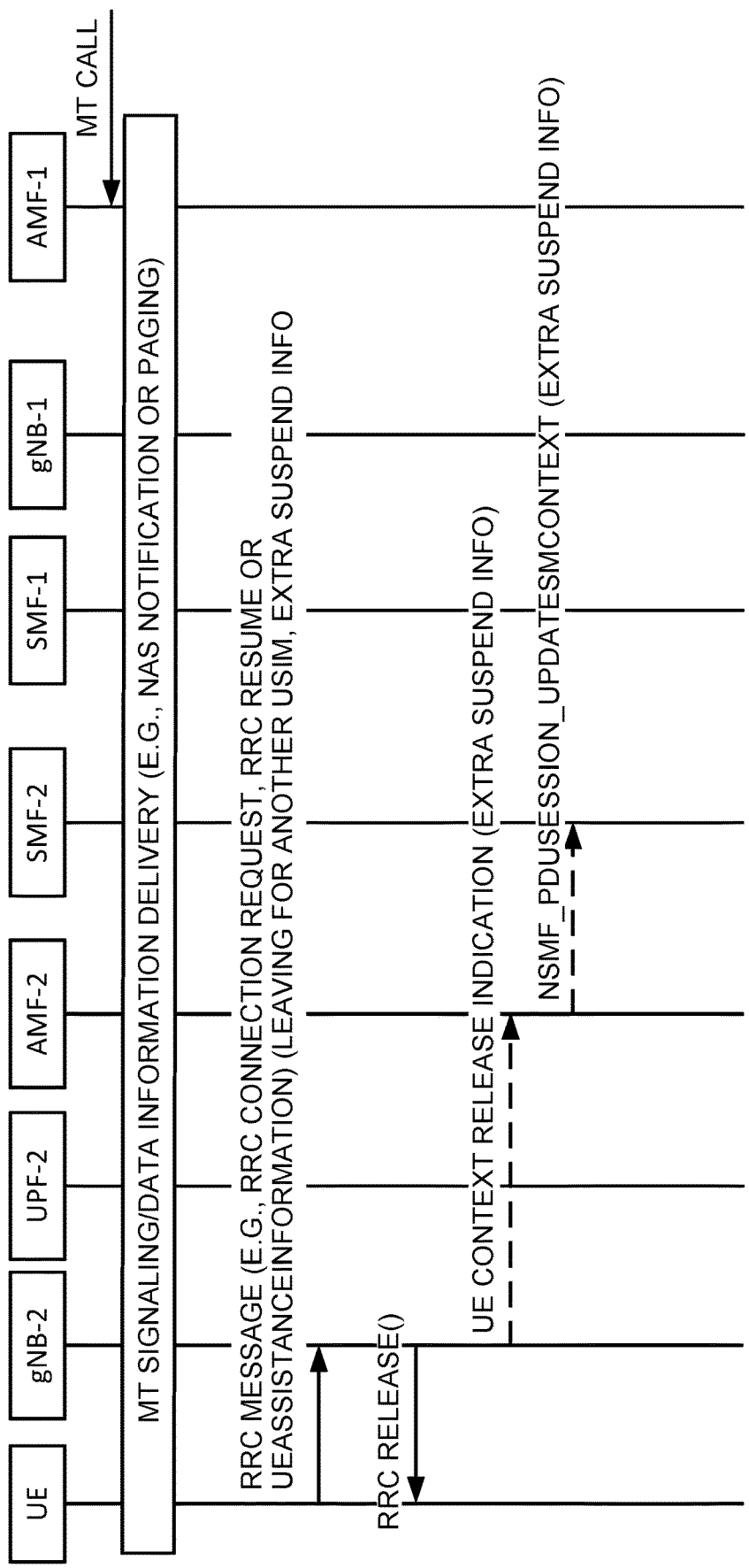
FIG. 2 is a signaling diagram of a UE leaving a network and staying in the network in CM CONNECTED with RRC Inactive in the network according to some embodiments of inventive concepts.

Turning to FIG. 1, a way for the UE to gracefully leave the network at the NAS level is illustrated. When the UE receives information from the network that there is mobile terminating signaling or data at PLMN1 while the UE is in PLMN2 with either CM-IDLE or Connected mode, the UE may perform the following steps and leave PLMN2 and the UE state in PLMN2 may be CM-IDLE or CM-Connected with RRC inactive. The steps include:

1. The UE sends a Service request (either in IDLE mode or Connected mode) to PLMN2 with following new information:
   a. The UE may include an indication that it will go to CM-IDLE mode for another USIM after connection release.
   b. The UE may also provide extra info on the possible handling of MT signaling/data handling and periodic mobility handling in this PLMN (e.g. paging shall not be triggered within certain time period if MT data is related to certain services identified by QoS parameters)
2. The AMF may either release the UE context towards RAN or perform UE context modification and perform
   a) and/or b) below.
   a. The AMF may use the extra information from the UE to decide if normal IDLE periodic mobility handling shall be adjusted if the UE shall be move to CM-IDLE mode.
   b. The AMF may also provide the extra info to the RAN for deciding if the UE shall be stay in CM-CONNECTED with RRC inactive state (see FIG. 2.)

3. If the decision is that UE shall be moved to idle mode, The AMF informs the SMF/UPF of the change to IDLE mode with following new information:
   a. Extra info from UE side can be used by SMF/UPF to adjust the DL data/signaling handling (e.g. no triggering of paging) and possible extra data buffering if it's possible In another embodiment (illustrated in FIG. 2) at the RRC level instead of at the NAS level, when the UE receives information from the network that there is mobile terminating signaling or data at PLMN1 while the UE is in RRC_IDLE state, RRC INACTIVE state or in RRC CONNECTED STATE in PLMN2, the UE may perform the following steps and leave PLMN2 and the UE state in PLMN2 will either be RRC inactive or CM-IDLE.

1. A UE in CM-Connected may send one or more RRC messages (e.g., if UE is in RRC IDLE state it could, for instance, be RRC Connection Request or RRC Connection Request and UEAssistanceInformation; if UE is in RRC INACTIVE state it could, for instance, be RRC Resume or RRC Resume and UEAssistanceInformation; if UE is in RRC CONNECTED state it could, for instance, be UEAssistanceInformation) to PLMN2, at least one of which with the following information:
   a. The UE may include an indication that it will go to RRC inactive mode for another USIM after connection release.
   b. The UE may also provide extra information on the possible handling of MT signaling/data handling and periodic RNA handling in this PLMN (e.g. paging shall not be triggered within certain time period if MT signaling/data is related to certain services identified by QoS parameters). For example, the UE may specify which service classes the UE wants to receive notification for when MT signaling/data is received in the PLMN when the UE is in another PLMN. The UE may also specify a time period for which the notifications are valid. In other words, notifications may not be sent after expiration of the time period.
2. The RAN responds to UE first, then can either release the UE context towards the AMF with extra information from the UE (i.e. move UE to IDLE mode), or send UE context suspend request with extra information from the UE (i.e. move UE to IDLE mode with suspend), or just enter RRC inactive state without informing the AMF.
   a. The AMF may use the extra information from the UE to decide if normal IDLE periodic mobility handling shall be adjusted if the UE shall be move to CM-IDLE mode with or without suspend.
   b. If use is kept in RRC inactive state, the RAN may use the extra information provided in step 1b to handling the periodic RNA handling and MT signaling/data.
3. If the decision is that UE shall be moved to CM-IDLE mode, the AMF may inform SMF/UPF of the change to IDLE mode with the following information:
   a. Extra information from the UE that can be used by SMF/UPF to adjust the DL data/signaling handling (e.g. no triggering of paging) and possible extra data buffering when possible.
   b. Indicating if UE will be suspended. In case of suspend, the SMF/UPF shall keep the N3 tunnel information.

Operations of the user equipment 300 (implemented using the structure of the block diagram of FIG. 3) will now be discussed with reference to the flow chart of FIG. 6 according to some embodiments of inventive concepts. For example, modules may be stored in memory 305 of FIG. 3, and these modules may provide instructions so that when the instructions of a module are executed by respective UE processing circuitry 303, processing circuitry 303 performs respective operations of the flow chart.

Figure 6:
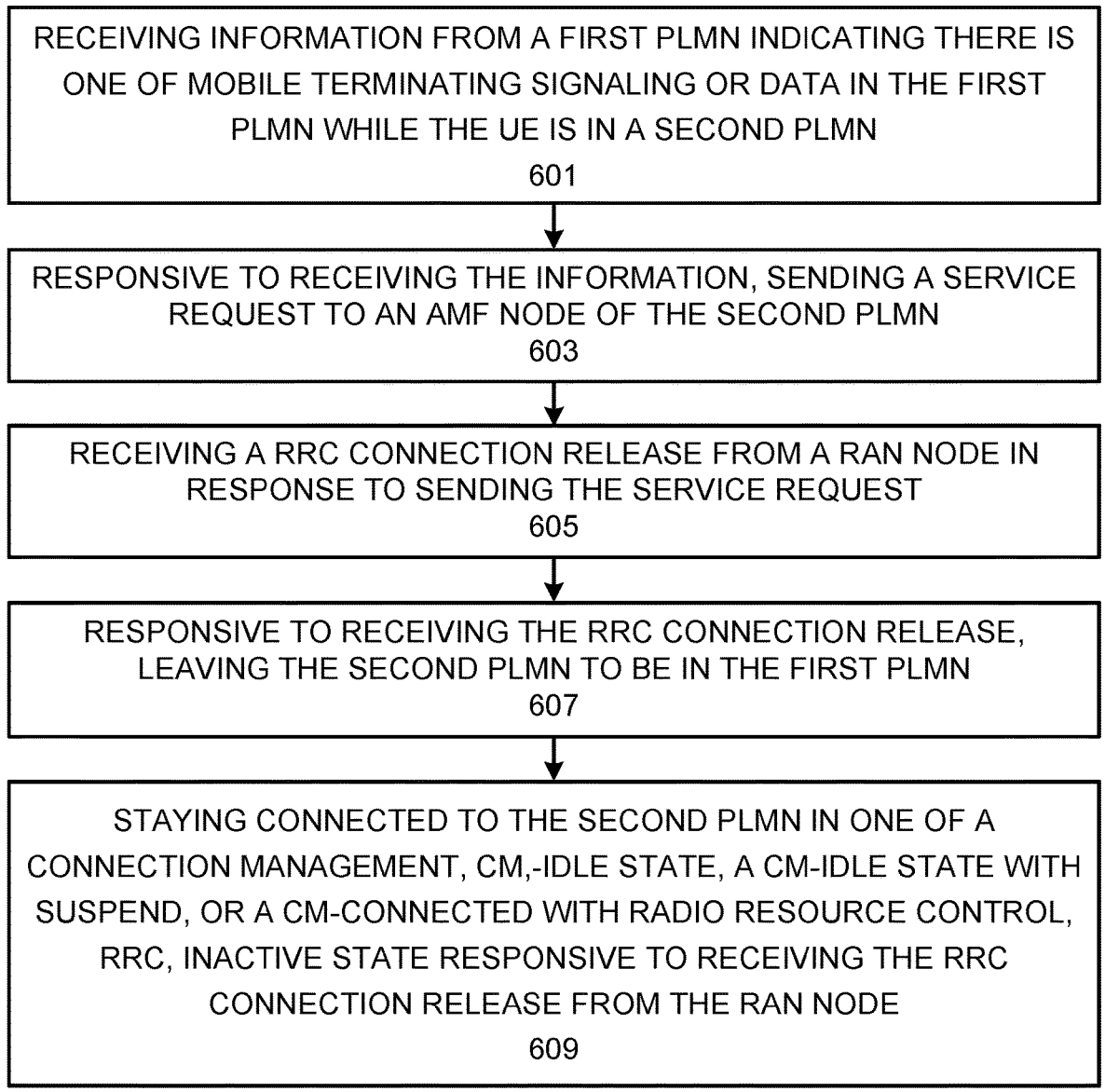
FIGS. 6 and 7 are flow charts illustrating operations of a user equipment according to some embodiments of inventive concepts.

Turning to FIG. 6, in block 601, the processing circuitry 303 may receive, via transceiver 301, information from a first public land mobile network (PLMN) indicating there is one of mobile terminating signaling or data in the first PLMN while the UE is in a second PLMN.

In block 603, the processing circuitry 303 may, responsive to receiving the information, send a service request to an access and mobility management function (AMF) node of the second PLMN. In sending the service request to the AMF node of the second PLMN, the processing circuitry 303 may send the service request with information on handling MT signaling/data for the UE in the second PLMN while the UE is in the first PLMN. For example, the information may indicate which service classes the UE has selected to be notified when MT signaling or data is received for the service classes selected by the UE while the UE is in the first PLMN. In one embodiment, the UE may select the service classes from a list of service classes. In another embodiment, the UE may deselect service classes listed in a list that the UE does not want to receive. In this embodiment, the AMF node uses the service classes that were not deselected as service classes the UE wants to receive information about while in the first PLMN. In yet another embodiment, the UE may list service classes the UE desires to receive notifications about when MT signaling/data is received that is from a service class selected.

In one embodiment, sending the service request to the AMF node of the second PLMN includes sending the service request with information on handling MT signaling/data for the UE in the second PLMN while the UE is in the first PLMN. The information may indicate which service classes the UE has selected to be notified while the UE is in the first PLMN. For example, the UE may only be interested in voice service classes, data service classes, etc. Sending the service request to the AMF node of the second PLMN may further includes sending the service request with information indicating a time period the information is valid while the US in in the first PLMN. When the time period is sent, the AMF will send the notifications while the time period is in force and not send any notifications after the time period has expired.

In block 605, the processing circuitry 303 may receive, via the transceiver circuitry 301, one of a UE context release and a UE context modification from the AMF node of the second PLMN in response to sending the service request. Note that the one of the UE context release and the UE context modification from the AMF node may is some embodiments be in the form of a RRC connection release from the RAN node.

In block 607, the processing circuitry 303 may, responsive to receiving the one of the UE context release and the UE context modification, leave the second PLMN to be in the first PLMN.

In block 609, the processing circuitry 303 may stay connected (i.e., keep the UE connected) to the second PLMN in one of a connection management, CM,-idle state or a CM-connected with radio resource control, RRC, inactive state responsive to receiving the UE context modification from the AMF node of the second PLMN.

Various operations from the flow chart of FIG. 6 may be optional with respect to some embodiments of wireless devices and related methods. Regarding methods of example embodiment 1 (set forth below), for example, operations of block 609 of FIG. 6 may be optional.

In another embodiment, operations of the user equipment 300 (implemented using the structure of the block diagram of FIG. 3) will now be discussed with reference to the flow chart of FIG. 7 according to some embodiments of inventive concepts. For example, modules may be stored in memory 305 of FIG. 3, and these modules may provide instructions so that when the instructions of a module are executed by respective UE processing circuitry 303, processing circuitry 303 performs respective operations of the flow chart.

Figure 7:
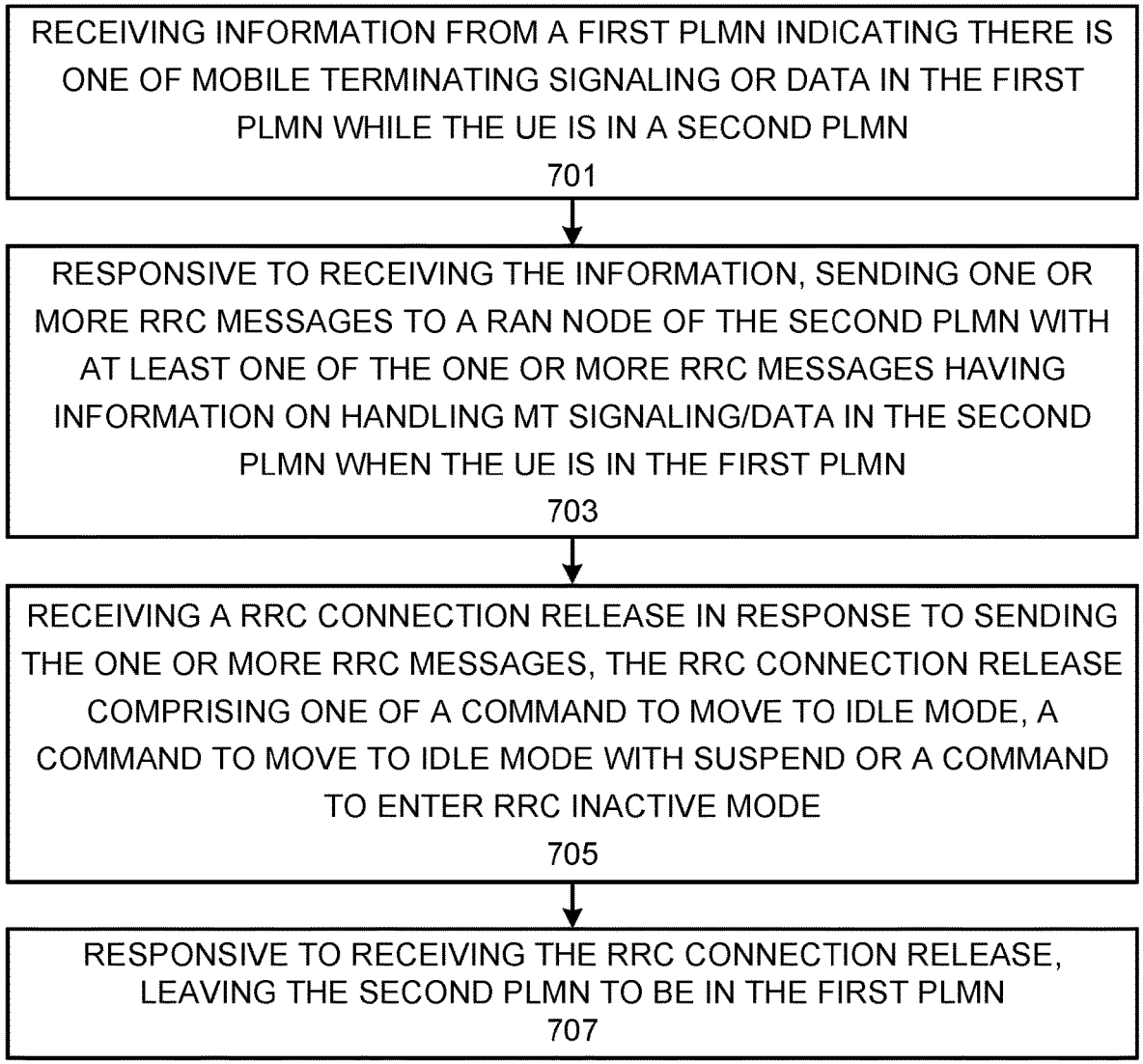

Turning to FIG. 7, in block 701, the processing circuitry 303 may receive, via transceiver circuitry 301 information from a first PLMN indicating there is one of mobile terminating (MT) signaling or MT data in the first PLMN while the UE is in a second PLMN.

In block 703, the processing circuitry 303 may, responsive to receiving the information, send, via transceiver circuitry 301, one or more radio resource control, RRC, messages to a radio access network, RAN node of the second PLMN with at least one of the one or more RRC messages having information on handling MT signaling/data in the second PLMN when the UE is in the first PLMN. In sending the one or more RRC message, the processing circuitry 303 may send the one or more messages with information on which service classes the UE has selected to be notified about while the UE is in the first PLMN. The processing circuitry 303 may send the one or more RRC messages with further information indicating a time period the information is valid while the US in in the first PLMN.

In another embodiment, the processing circuitry 303 may send the one or more RRC messages where the information on handling includes information that the UE shall not be paged while in the first PLMN and information that the UE will be sent a notification to the UE for service classes selected by the UE when MT signaling or data is received for the service classes selected by the UE is received in the second PLMN in the time period when the time period is indicated by UE.

In a further embodiment, the processing circuitry 303 may send the one or more RRC messages with the information further including an indication that the UE will enter RRC inactive mode in the second PLMN after being released from the second PLMN.

In block 705, the processing circuitry 303 may receive, via transceiver 301, a UE context release in response to sending the one or more RRC message, the UE context release comprising one of a command to move to idle mode, a command to move to idle mode with suspend or a command to enter RRC inactive mode.

In block 707, the processing circuitry 303 may, responsive to receiving the UE context, leave the second PLMN to be in the first PLMN.

Operations of an access and mobility management function (AMF) node 400 (implemented using the structure of FIG. 4) will now be discussed with reference to the flow chart of FIG. 8 according to some embodiments of inventive concepts. For example, modules may be stored in memory 405 of FIG. 4, and these modules may provide instructions so that when the instructions of a module are executed by respective network node processing circuitry 403, processing circuitry 403 performs respective operations of the flow chart.

Figure 8:
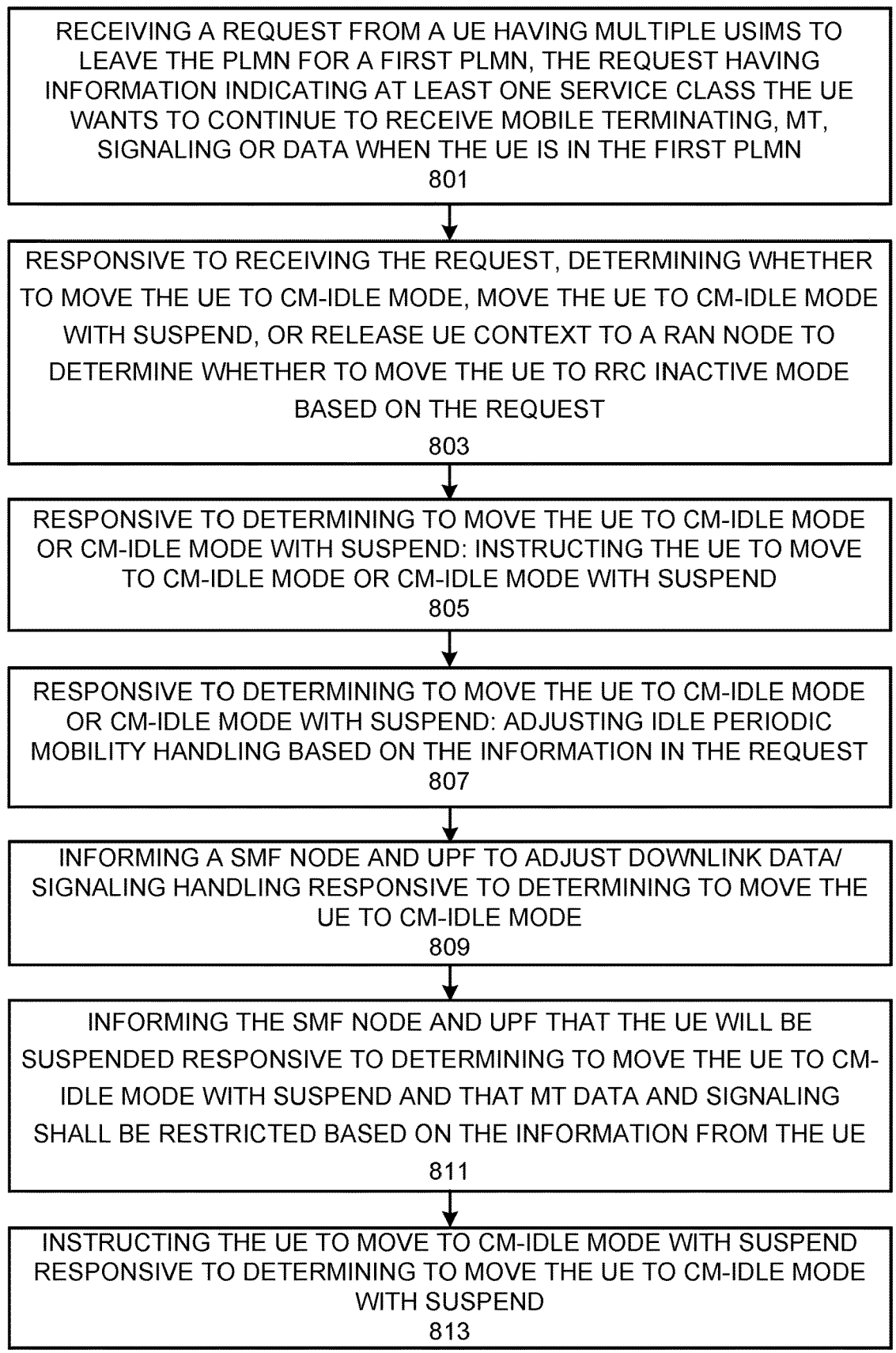
FIG. 8 is a flow chart illustrating operations of an AMF node according to some embodiments of inventive concepts.

Turning to FIG. 8, in block 801, the processing circuitry 403 may receive, via transceiver 401 and/or network interface 407, a request from a user equipment, UE, having multiple universal subscriber identity modules, USIMs, to leave the PLMN for a first PLMN, the request comprising information indicating at least one service class the UE wants to continue to receive mobile terminating, MT, signaling or data received in the PLMN when the UE is in the first PLMN.

In block 803, the processing circuitry 403 may, responsive to receiving the request, determine whether to move the UE to connection management, CM,-idle mode, move the UE to CM-idle mode with suspend, or release UE context to a radio access network, RAN, node to determine whether to move the UE to radio resource control, RRC, inactive mode based on the request.

Responsive to determining to move the UE to CM-idle mode or CM-idle mode with suspend, the processing circuitry 403 may instruct the UE to move to CM-idle mode or CM-idle mode with suspension in block 805 and adjust idle periodic mobility handling based on the information in the request in block 807.

In block 809, the processing circuitry 403 may inform a session management function, SMF, node and user plane function, UPF, to adjust downlink data/signaling handling responsive to determining to move the UE to CM-idle mode.

In block 811, the processing circuitry 403 may inform the SMF node and UPF that the UE will be suspended responsive to determining to move the UE to CM-idle mode with suspend and that MT data and signaling shall be restricted based on the information from the UE.

In block 813, the processing circuitry 403 may instruct the UE to move to CM-idle mode with suspend responsive to determining to move the UE to CM-idle mode with suspend Various operations from the flow chart of FIG. 8 may be optional with respect to some embodiments of network nodes and related methods. Regarding methods of example embodiment 16 (set forth below), for example, operations of blocks 809, 811, and 813 of FIG. 8 may be optional.

Operations of a RAN node 500 (implemented using the structure of FIG. 5) will now be discussed with reference to the flow chart of FIG. 9 according to some embodiments of inventive concepts. For example, modules may be stored in memory 505 of FIG. 5, and these modules may provide instructions so that when the instructions of a module are executed by respective network node processing circuitry 503, processing circuitry 503 performs respective operations of the flow chart.

Figure 9:
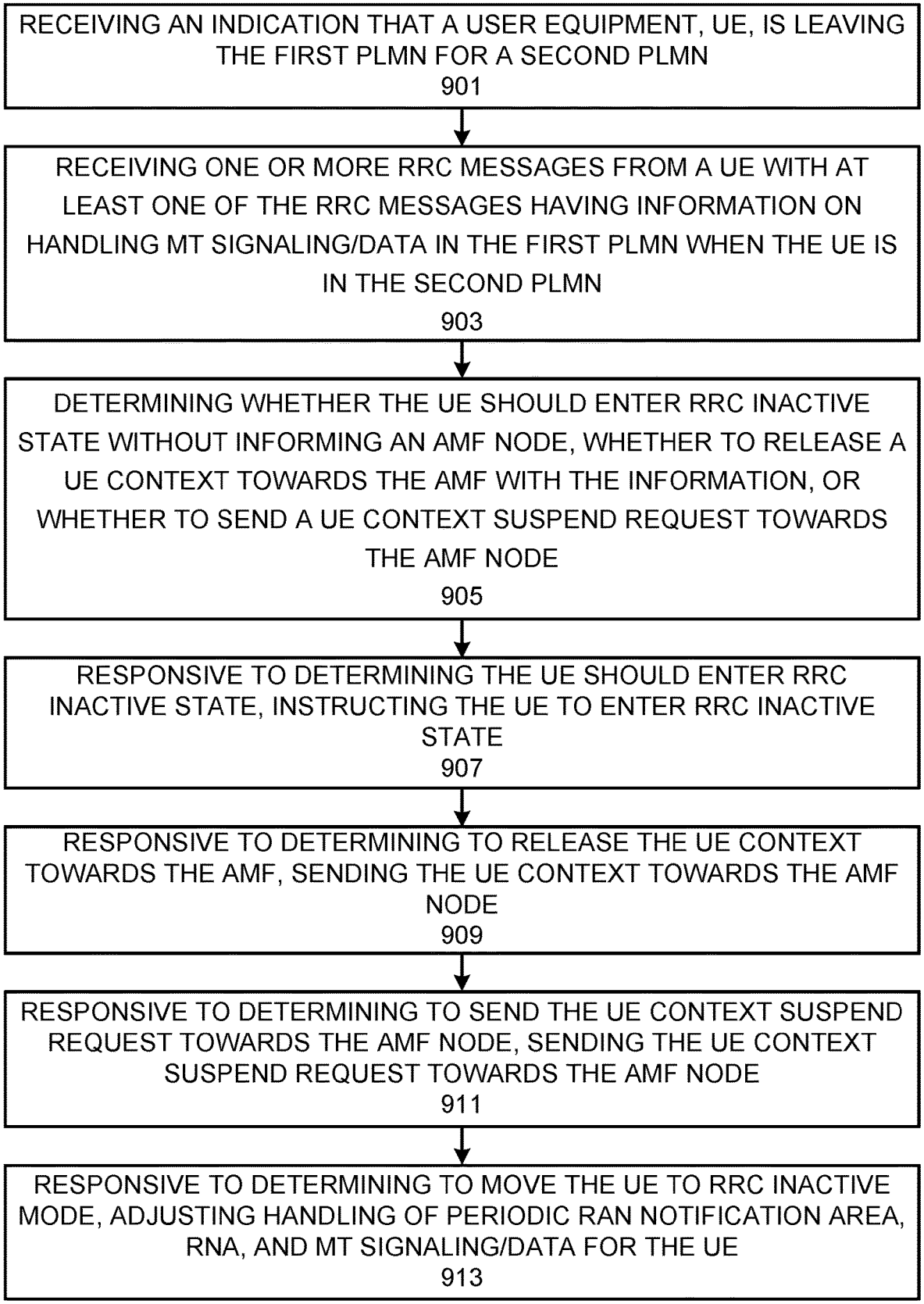
FIG. 9 is a flow chart illustrating operations of a RAN node according to some embodiments of inventive concepts.

Turning to FIG. 9, in block 901, the processing circuitry 503 may receive, via transceiver 501 and/or network interface 507, an indication that a user equipment, UE, is leaving the first PLMN for a second PLMN. In block 903, the processing circuitry 503 may receive, via transceiver 501 and/or network interface 507, one or more radio resource control, RRC, messages from a user equipment, UE, with at least one of the RRC messages having information on handling MT signaling/data in the first PLMN when the UE is in the second PLMN.

In block 905, the processing circuitry 503 may determine whether the UE should enter RRC inactive state without informing an access and mobility management function, AMF, node, whether to release a UE context towards the AMF with the information, or whether to send a UE context suspend request towards the AMF node.

In block 907, responsive to determining the UE should enter the RRC inactive state, the processing circuitry 503 may instruct the UE to enter the RRC inactive state.

In block 909, responsive to determining to release the UE context towards the AMF, the processing circuitry 503 may send the UE context towards the AMF node. In block 911, responsive to determining to send the UE context suspend request towards the AMF the processing circuitry 503 may send the UE context suspend request towards the AMF node.

In block 913, responsive to determining to move the UE to RRC inactive mode, the processing circuitry 503 may adjust handling of periodic RAN notification area, RNA, and MT signaling/data for the UE.

Various operations from the flow chart of FIG. 9 may be optional with respect to some embodiments of RAN nodes and related methods. Regarding methods of example embodiment 23 (set forth below), for example, operations of block 913 of FIG. 8 may be optional.

Example embodiments are discussed below.

Embodiment 1

A method performed by a processor in a user equipment, UE, having multiple universal subscriber identity modules, USIMs, the method comprising:
receiving (601) information from a first public land mobile network, PLMN, indicating there is one of mobile terminating, MT, signaling or data in the first PLMN while the UE is in a second PLMN;
responsive to receiving the information, sending (603) a service request to an access and mobility management function, AMF, node of the second PLMN;
receiving (605) one of a UE context release and a UE context modification from the AMF node of the second PLMN in response to sending the service request; and
responsive to receiving the one of the UE context release and the UE context modification, leaving (607) the second PLMN to be in the first PLMN.

Embodiment 2

The method of Embodiment 1, further comprising:
staying (609) connected to the second PLMN in one of a connection management, CM,-idle state or a CM-connected with radio resource control, RRC, inactive state responsive to receiving the UE context modification from the AMF node of the second PLMN.

Embodiment 3

The method of any of Embodiments 1-2 wherein sending the service request to the AMF node of the second PLMN comprises sending the service request with information on handling MT signaling/data for the UE in the second PLMN while the UE is in the first PLMN.

Embodiment 4

The method of Embodiment 3 wherein sending the service request to the AMF node of the second PLMN further comprises sending the service request with information indicating which service classes the UE has selected to be notified while the UE is in the first PLMN.

Embodiment 5

The method of Embodiment 4 wherein sending the service request to the AMF node of the second PLMN further comprises sending the service request with further information indicating a time period the information is valid while the US in in the first PLMN.

Embodiment 6

The method of and of Embodiments 4-5 wherein sending the service request to the AMF node of the second PLMN comprises sensing information on handling that comprises information that the UE shall not be paged while in the first PLMN and information that the UE will be sent a notification to the UE for service classes selected by the UE when MT signaling or data is received for the service classes selected by the UE is received in the second PLMN in the time period when the time period is indicated by UE.

Embodiment 7

A method performed by a processor in a user equipment, UE, having multiple universal subscriber identity modules, USIMs, the method comprising:
receiving (701) information from a first PLMN indicating there is one of mobile terminating, MT, signaling or data in the first PLMN while the UE is in a second PLMN;
responsive to receiving the information, sending (703) one or more radio resource control, RRC, messages to a radio access network, RAN node of the second PLMN with at least one of the one or more RRC messages having information on handling MT signaling/data in the second PLMN when the UE is in the first PLMN;
receiving (705) a UE context release in response to sending the one or more RRC message, the UE context release comprising one of a command to move to idle mode, a command to move to idle mode with suspend or a command to enter RRC inactive mode; and
responsive (707) to receiving the UE context, leaving the second PLMN to be in the first PLMN.

Embodiment 8

The method of Embodiment 6 wherein sending the one or more RRC messages comprises sending the one or more RRC messages with the information further comprising an indication that the UE will enter RRC inactive mode in the second PLMN after being released from the second PLMN.

Embodiment 9

The method of any of Embodiments 7-8 wherein sending the one or more RRC messages to the RAN node of the second PLMN comprises sending the one or more RRC messages with information on which service classes the UE has selected to be notified about while the UE is in the first PLMN.

Embodiment 10

The method of Embodiment 9 wherein sending the one or more RRC messages to the RAN node of the second PLMN comprises sending the one or more RRC messages with further information indicating a time period the information is valid while the US in in the first PLMN.

Embodiment 11

The method of and of Embodiments 9-10 wherein sending the one or more RRC messages to the RAN node of the second PLMN comprises sending the one or more RRC messages with the information on handling further comprising information that the UE shall not be paged while in the first PLMN and information that the UE will be sent a notification to the UE for service classes selected by the UE when MT signaling or data is received for the service classes selected by the UE is received in the second PLMN in the time period when the time period is indicated by UE.

Embodiment 12

A wireless device (300) configured to operate in a communication network, the wireless device comprising:
processing circuitry (303); and
memory (305) coupled with the processing circuitry, wherein the memory includes instructions that when executed by the processing circuitry causes the wireless device to perform operations according to any of Embodiments 1-11.

Embodiment 13

A wireless device (300) configured to operate in a communication network, wherein the wireless device is adapted to perform according to any of Embodiments 1-11.

Embodiment 14

A computer program comprising program code to be executed by processing circuitry (303) of a wireless device (300) configured to operate in a communication network, whereby execution of the program code causes the wireless device (300) to perform operations according to any of embodiments 1-11.

Embodiment 15

A computer program product comprising a non-transitory storage medium including program code to be executed by processing circuitry (303) of a wireless device (300) configured to operate in a communication network, whereby execution of the program code causes the wireless device (300) to perform operations according to any of embodiments 1-11.

Embodiment 16

A method performed by a processor in an access and mobility management function, AMF, node of a public land mobile network, PLMN, the method comprising:
receiving (801) a request from a user equipment, UE, having multiple universal subscriber identity modules, USIMs, to leave the PLMN for a first PLMN, the request comprising information indicating at least one service class the UE wants to continue to receive mobile terminating, MT, signaling or data received in the PLMN when the UE is in the first PLMN;
responsive to receiving the request, determining (803) whether to move the UE to connection management, CM,-idle mode, move the UE to CM-idle mode with suspend, or release UE context to a radio access network, RAN, node to determine whether to move the UE to radio resource control, RRC, inactive mode based on the request; and
responsive to determining to move the UE to CM-idle mode or CM-idle mode with suspend:
instructing (805) the UE to move to CM-idle mode or CM-idle mode with suspend; and
adjusting (807) idle periodic mobility handling based on the information in the request.

Embodiment 17

The method of Embodiment 16, further comprising:
informing (809) a session management function, SMF, node and user plane function, UPF, to adjust downlink data/signaling handling responsive to determining to move the UE to CM-idle mode.

Embodiment 18

The method of Embodiment 17, further comprising:
informing (811) the SMF node and UPF that the UE will be suspended responsive to determining to move the UE to CM-idle mode with suspend and that MT data and signaling shall be restricted based on the information from the UE; and
instructing (813) the UE to move to CM-idle mode with suspend responsive to determining to move the UE to CM-idle mode with suspend.

Embodiment 19

An access and mobility management function, AMF, node (400) configured to operate in a communication network, the network node comprising:
processing circuitry (403); and
memory (405) coupled with the processing circuitry, wherein the memory includes instructions that when executed by the processing circuitry causes the AMF node to perform operations according to any of Embodiments 16-18.

Embodiment 20

An access and mobility management function, AMF, node (400) configured to operate in a communication network, wherein the AMF node is adapted to perform according to any of Embodiments 16-18.

Embodiment 21

A computer program comprising program code to be executed by processing circuitry (403) of an access and mobility management function, AMF, node (400) configured to operate in a communication network, whereby execution of the program code causes the AMF node (400) to perform operations according to any of embodiments 16-18.

Embodiment 22

A computer program product comprising a non-transitory storage medium including program code to be executed by processing circuitry (403) of an access and mobility management function, AMF, node (400) configured to operate in a communication network, whereby execution of the program code causes the AMF node (400) to perform operations according to any of embodiments 16-18.

Embodiment 23

A method of operating a radio access network, RAN, node in a first public land mobile network, PLMN, the method comprising:

receiving (901) an indication that a user equipment, UE, is leaving the first PLMN for a second PLMN;
receiving (903) one or more radio resource control, RRC, messages from a user equipment, UE, with at least one of the RRC messages having information on handling MT signaling/data in the first PLMN when the UE is in the second PLMN;
determining (905) whether the UE should enter RRC inactive state without informing an access and mobility management function, AMF, node, whether to release a UE context towards the AMF with the information, or whether to send a UE context suspend request towards the AMF node;
responsive to determining the UE should enter RRC inactive state, instructing (907) the UE to enter RRC inactive state;
responsive to determining to release the UE context towards the AMF, sending (909) the UE context towards the AMF node; and
responsive to determining to send the UE context suspend request towards the AMF node, sending (911) the UE context suspend request towards the AMF node.

Embodiment 24

The method of Embodiment 23 further comprising:
responsive to determining to move the UE to RRC inactive mode, adjusting (913) handling of periodic RAN notification area, RNA, and MT signaling/data for the UE.

Embodiment 25

A radio access network, RAN, node (500) configured to operate in a communication network, the RAN node comprising:
processing circuitry (503); and
memory (505) coupled with the processing circuitry, wherein the memory includes instructions that when executed by the processing circuitry causes the RAN node to perform operations according to any of Embodiments 23-24.

Embodiment 26

A radio access network, RAN, node (500) configured to operate in a communication network, wherein the RAN node is adapted to perform according to any of Embodiments 23-24.

Embodiment 27

A computer program comprising program code to be executed by processing circuitry (503) of a radio access network, RAN, node (500) configured to operate in a communication network, whereby execution of the program code causes the RAN node (500) to perform operations according to any of embodiments 23-24.

Embodiment 28

A computer program product comprising a non-transitory storage medium including program code to be executed by processing circuitry (403) of a radio access network, RAN, node (500) configured to operate in a communication network, whereby execution of the program code causes the RAN node (500) to perform operations according to any of embodiments 23-24.

Explanations are provided below for various abbreviations/acronyms used in the present disclosure.

| Abbreviation | Explanation |
| --- | --- |
| AMF | Access and Mobility Management Function |
| NAS | Non-Access Stratum |
| PLMN | public land mobile network |
| RRC | Radio Resource Control |
| SMF | Session Management Function |
| N3IWF | Non-3GPP Interworking Function |
| UPF | User Plane Function |
| RAN | Radio Access Network |

References are identified below.
1. TS 23.501—$3^{rd}$ Generation Partnership Project; Technical Specification Group Services and System Aspects; System architecture for the 5G System (5GS), Stage 2, Release 16, V. 16.2.0. 2019 September
2. TS 23.502—$3^{rd}$ Generation Partnership Project; Technical Specification Group Services and System Aspects; Procedures for the 5G System (5GS); Stage 2, Release 16, V.16.2.0. 2019 September Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method performed by a processor in a user equipment, UE, having multiple universal subscriber identity modules, USIMs, the method comprising:
receiving information from a first public land mobile network, PLMN, associated with a first USIM of the multiple USIMs, indicating there is one of mobile terminating, MT, signaling or data in the first PLMN while the UE is actively communicating with a second PLMN associated with a second USIM of the multiple USIMs;
responsive to receiving the information, sending a service request to an access and mobility management function, AMF, node of the second PLMN, the service request comprising information indicating which service classes the UE has selected to be notified while the UE is in the idle or inactive state;
receiving a radio resource control, RRC, connection release from a radio access network, RAN, node of the second PLMN in response to sending the service request.

2. The method of claim 1, further comprising:
staying connected to the second PLMN in one of a connection management, CM,-idle state, a CM-idle state with suspend, or a CM-connected with RRC inactive state responsive to receiving the RRC connection release from the RAN node.

3. The method of claim 1 wherein sending the service request to the AMF node of the second PLMN comprises sending the service request with information on handling MT signaling/data for the UE in the second PLMN while the UE is in the first PLMN.

4. The method of claim 1 wherein sending the service request to the AMF node of the second PLMN further comprises sending the service request with further information indicating a time period the information is valid while the UE is in the first PLMN.

5. The method of claim 1 wherein sending the service request to the AMF node of the second PLMN comprises sensing information on handling that comprises information that the UE shall not be paged while in the first PLMN and information that the UE will be sent a notification to the UE for service classes selected by the UE when MT signaling or data is received for the service classes selected by the UE is received in the second PLMN in the time period when the time period is indicated by UE.

6. A method performed by a processor in a user equipment, UE, having multiple universal subscriber identity modules, USIMs, the method comprising:
receiving information from a first public land mobile network, PLMN, associated with a first USIM of the multiple USIMs, indicating there is one of mobile terminating, MT, signaling or data in the first PLMN while the UE is actively communicating with a second PLMN associated with a second USIM of the multiple USIMs;
responsive to receiving the information, sending one or more radio resource control, RRC, messages to a radio access network, RAN, node of the second PLMN with at least one of the one or more RRC messages comprising an indication that the UE will enter RRC inactive mode in the second PLMN after being released from the second PLMN and information on which service classes the UE has selected to be notified about while the UE is in RRC inactive mode;
receiving a RRC connection release in response to sending the one or more RRC message, the RRC connection release comprising one of a command to move to idle mode, a command to move to idle mode with suspend or a command to enter RRC inactive mode.

7. The method of claim 6 wherein sending the one or more RRC messages comprises:
having information on handling MT signaling/data in the second PLMN when the UE is in the first PLMN.

8. The method of claim 6 wherein sending the one or more RRC messages to the RAN node of the second PLMN comprises sending the one or more RRC messages with further information indicating a time period the information is valid while the UE in in the first PLMN.

9. The method of claim 6 wherein sending the one or more RRC messages to the RAN node of the second PLMN comprises sending the one or more RRC messages with the information on handling further comprising information that the UE shall not be paged while in the first PLMN and information that the UE will be sent a notification to the UE for service classes selected by the UE when MT signaling or data is received for the service classes selected by the UE is received in the second PLMN in the time period when the time period is indicated by UE.

10. A wireless device configured to operate in a communication network, the wireless device having multiple universal subscriber identity modules, USIMs, and comprising:
processing circuitry; and
memory coupled with the processing circuitry, wherein the memory includes instructions that when executed by the processing circuitry causes the wireless device to perform operations comprising:
receiving information from a first public land mobile network, PLMN, associated with a first USIM of the multiple USIMs, indicating there is one of mobile terminating, MT, signaling or data in the first PLMN while the UE is actively communicating with a second PLMN associated with a second USIM of the multiple USIMs;
responsive to receiving the information, sending a service request to an access and mobility management function, AMF, node of the second PLMN, the service request comprising information indicating which service classes the UE has selected to be notified while the UE is in the idle or inactive state;
receiving a radio resource control, RRC, connection release from a radio access network, RAN, node of the second PLMN in response to sending the service request.

11. A wireless device configured to operate in a communication network, the wireless device comprising:
processing circuitry; and
memory coupled with the processing circuitry, wherein the memory includes instructions that when executed by the processing circuitry causes the wireless device to perform operations comprising:
receiving information from a first public land mobile network, PLMN, associated with a first USIM of the multiple USIMs, indicating there is one of mobile terminating, MT, signaling or data in the first PLMN while the UE is actively communicating with a second PLMN associated with a second USIM of the multiple USIMs;
responsive to receiving the information, sending one or more radio resource control, RRC, messages to a radio access network, RAN, node of the second PLMN with at least one of the one or more RRC messages comprising an indication that the UE will enter RRC inactive mode in the second PLMN after being released from the second PLMN and information on which service classes the UE has selected to be notified about while the UE is in RRC inactive mode;

receiving a RRC connection release in response to sending the one or more RRC message, the RRC connection release comprising one of a command to move to idle mode, a command to move to idle mode with suspend or a command to enter RRC inactive mode.

12. A method performed by a processor in an access and mobility management function, AMF, node of a public land mobile network, PLMN, the method comprising:

receiving a request from a user equipment, UE, having multiple universal subscriber identity modules, USIMs, the request including an indication that the UE will go to an idle or inactive state for the PLMN and comprising information indicating at least one service class the UE wants to continue to receive mobile terminating, MT, signaling or data received in the PLMN when the UE is in the idle or inactive state;

responsive to receiving the request, determining whether to move the UE to connection management, CM,-idle mode, move the UE to CM-idle mode with suspend, or modify UE context to a radio access network, RAN, node to determine whether to move the UE to radio resource control, RRC, inactive mode based on the request; and responsive to determining to move the UE to CM-idle mode or CM-idle mode with suspend:

instructing the UE to move to CM-idle mode or CM-idle mode with suspend; and adjusting idle periodic mobility handling based on the information in the request.

13. The method of claim 12, further comprising:

informing a session management function, SMF, node and user plane function, UPF, to adjust downlink data/signaling handling responsive to determining to move the UE to CM-idle mode.

14. The method of claim 13, further comprising:

informing the SMF node and UPF that the UE will be suspended responsive to determining to move the UE to CM-idle mode with suspend and that MT data and signaling shall be restricted based on the information from the UE; and instructing the UE to move to CM-idle mode with suspend responsive to determining to move the UE to CM-idle mode with suspend.

15. A non-transitory computer-readable medium storing a computer program comprising program code to be executed by processing circuitry of an access and mobility management function, AMF, node configured to operate in a communication network, whereby execution of the program code causes the AMF node to perform operations according to claim 12.

16. A computer program product comprising a non-transitory storage medium including program code to be executed by processing circuitry of an access and mobility management function, AMF, node configured to operate in a communication network, whereby execution of the program code causes the AMF node to perform operations according to claim 12.

17. An access and mobility management function, AMF, node configured to operate in a communication network, the AMF node comprising:

processing circuitry; and memory coupled with the processing circuitry, wherein the memory includes instructions that when executed by the processing circuitry causes the AMF node to perform operations comprising:

receiving a request from a user equipment, UE, having multiple universal subscriber identity modules, USIMs, the request including an indication that the UE will go to an idle or inactive state for the public land mobile network, PLMN, and comprising information indicating at least one service class the UE wants to continue to receive mobile terminating, MT, signaling or data received in the PLMN when the UE is in the first PLMN;

responsive to receiving the request, determining whether to move the UE to connection management, CM,-idle mode, move the UE to CM-idle mode with suspend, or modify UE context to a radio access network, RAN, node to determine whether to move the UE to radio resource control, RRC, inactive mode based on the request; and responsive to determining to move the UE to CM-idle mode or CM-idle mode with suspend:

instructing the UE to move to CM-idle mode or CM-idle mode with suspend; and adjusting idle periodic mobility handling based on the information in the request.

18. A method of operating a radio access network, RAN, node in a first public land mobile network, PLMN, the method comprising:

receiving an indication from a user equipment, UE, that the UE will enter radio resource control, RRC, inactive state in the first PLMN;

receiving one or more RRC messages from the UE with at least one of the RRC messages having information on handling MT signaling/data in the first PLMN when the UE is in RRC inactive state;

determining whether the UE should enter RRC inactive state without informing an access and mobility management function, AMF, node, whether to release a UE context towards the AMF with the information, or whether to send a UE context suspend request towards the AMF node;

responsive to determining the UE should enter RRC inactive state, instructing the UE to enter RRC inactive state;

responsive to determining to release the UE context towards the AMF, sending the UE context towards the AMF node; and responsive to determining to send the UE context suspend request towards the AMF node, sending the UE context suspend request towards the AMF node.

19. The method of claim 18 further comprising:

responsive to determining to move the UE to RRC inactive mode, adjusting handling of periodic RAN notification area, RNA, and MT signaling/data for the UE.

20. A radio access network, RAN, node configured to operate in a communication network, the RAN node comprising:

processing circuitry; and memory coupled with the processing circuitry, wherein the memory includes instructions that when executed by the processing circuitry causes the RAN node to perform operations comprising:

receiving an indication from a user equipment, UE, that the UE will enter radio resource control, RRC, inactive state in a first public land mobile network, PLMN;

receiving one or more RRC messages from a user equipment, UE, with at least one of the RRC messages having information on handling MT signaling/data in the first PLMN when the UE is in the second PLMN;

determining whether the UE should enter RRC inactive state without informing an access and mobility management function, AMF, node, whether to release a UE context towards the AMF with the information, or whether to send a UE context suspend request towards the AMF node;

responsive to determining the UE should enter RRC inactive state, instructing the UE to enter RRC inactive state;

responsive to determining to release the UE context towards the AMF, sending the UE context towards the AMF node; and responsive to determining to send the UE context suspend request towards the AMF node, sending the UE context suspend request towards the AMF node.

* * * * *